United States Patent
Deutschmann et al.

(10) Patent No.: US 12,050,675 B2
(45) Date of Patent: Jul. 30, 2024

(54) RADAR-BASED BEHAVIOMETRIC USER AUTHENTICATION

(71) Applicant: BEHAVIOSEC INC, San Francisco, CA (US)

(72) Inventors: Ingo Deutschmann, Frankleben (DE); Per Burstrom, Lulea (SE)

(73) Assignee: BEHA VIOSEC INC, San Francisco, CA (US)

( * ) Notice: Subject to any disclaimer, the term of this patent is extended or adjusted under 35 U.S.C. 154(b) by 47 days.

(21) Appl. No.: 17/938,762

(22) Filed: Oct. 7, 2022

(65) Prior Publication Data

US 2023/0029490 A1 Feb. 2, 2023

Related U.S. Application Data

(63) Continuation of application No. 17/357,013, filed on Jun. 24, 2021, now Pat. No. 11,507,650, which is a continuation of application No. 16/933,058, filed on Jul. 20, 2020, now Pat. No. 11,080,383.

(60) Provisional application No. 62/884,773, filed on Aug. 9, 2019.

(51) Int. Cl.
| | |
|---|---|
| *G06F 21/32* | (2013.01) |
| *G01S 13/42* | (2006.01) |
| *G01S 13/88* | (2006.01) |
| *G06F 3/01* | (2006.01) |

(52) U.S. Cl.
CPC .............. *G06F 21/32* (2013.01); *G01S 13/42* (2013.01); *G01S 13/88* (2013.01); *G06F 3/017* (2013.01)

(58) Field of Classification Search
CPC ...... G06F 21/32; G06F 3/017; G06F 3/04883; G06F 21/316; G01S 13/42; G01S 13/88; G01S 13/865; G01S 7/412; G01S 7/415; G01S 7/417; G01S 13/08; G01S 13/58; G01S 17/58
See application file for complete search history.

(56) References Cited

U.S. PATENT DOCUMENTS

| | | | |
|---|---|---|---|
| 11,080,383 B2 | 8/2021 | Deutschmann et al. | |
| 2016/0057623 A1* | 2/2016 | Dutt | H04W 12/126 455/411 |
| 2017/0197636 A1* | 7/2017 | Beauvais | B60R 25/257 |
| 2019/0187265 A1* | 6/2019 | Barbello | G06F 18/22 |
| 2019/0228140 A1* | 7/2019 | Arroyo | G06V 40/1365 |

(Continued)

*Primary Examiner* — Grant Sitta
(74) *Attorney, Agent, or Firm* — Troutman Pepper Hamilton Sanders LLP; James E. Schutz; Mark Lehi Jones

(57) ABSTRACT

A first behaviometric user profile for a first user is generated and stored, by detecting a position and velocity of the first user relative to the mobile device based on a received response from a radar transmission while the first user uses the mobile device, the received response over time indicating a position and velocity of the first user. Based on further received responses of additional radar transmissions an additional behavioral pattern of an unknown user is determined. The additional behavioral pattern is then compared to the first behaviometric user profile, and based on the comparison, a measure of similarity between the first behaviometric user profile and the additional behavioral pattern, measuring if the first user and the unknown user are a same user is heuristically determined. As a result of the comparison, operation or access to at least some data stored on the mobile device is prevented.

20 Claims, 5 Drawing Sheets

(56) References Cited

U.S. PATENT DOCUMENTS

| | | | |
|---|---|---|---|
| 2020/0204541 A1* | 6/2020 | Nair | H04L 63/0853 |
| 2020/0410072 A1 | 12/2020 | Giusti et al. | |
| 2021/0029542 A1 | 1/2021 | Prag et al. | |

* cited by examiner

RADAR-BASED BEHAVIOMETRIC USER AUTHENTICATION

CROSS-REFERENCE TO RELATED APPLICATIONS

This application is a continuation application claiming priority to U.S. patent application Ser. No. 17/357,013, filed 24 Jun. 2021 and published as U.S. Patent Application Publication No. US20210326425 on 21 Oct. 2021. U.S. patent application Ser. No. 17/357,013 is a continuation application claiming priority to U.S. patent application Ser. No. 16/933,058, filed 20 Jul. 2020, and issued as U.S. Pat. No. 11,080,383 on 8 Mar. 2021. U.S. patent application Ser. No. 16/933,058 claims priority to U.S. Provisional Patent No. 62/884,773, filed on 9 Aug. 2019. The contents of each are incorporated herein by reference as if presented in full.

FIELD OF THE DISCLOSED TECHNOLOGY

The disclosed technology relates to behaviometric user authentication and, more specifically to granting or denying access based on recognition of hand or finger behavior of the user, which are detected by radar.

BACKGROUND OF THE DISCLOSED TECHNOLOGY

In today's environment, where many actions and transactions, including financial transactions, are accomplished via suitable applications run on a computing device, accurate authentication of the authorized, or legitimate user, is necessary to ensure safety of the action or transaction. Many systems use a multi-factor authentication process to determine whether or not a user attempting access to a website or an application is authorized to access the website or application, and/or to carry out the desired action or transaction.

Typically, authentication of users is achieved by password input, biometric recognition, behaviometric recognition based on collection of behaviometric data for a user, and other authentication mechanisms.

Common handheld devices, such as smartphones, include a plurality of sensors and actors for user interaction, such as microphone(s), speaker(s), camera(s), graphical display(s) and accelerometer(s). During interaction with an application, such as a banking application, the time spent physically touching the screen is typically much shorter and erratically distributed than periods spent watching the screen, when the user's fingers are typically idly held over or on the side of the device.

U.S. Patent Application Publication No. 2018/0046255 describes a radar-based sensing module for gestural control of a mobile phone or other user device in a vehicle. A radar receiver can detect a movement of a user's hands near the steering wheel while the user is driving a car.

U.S. Pat. No. 10,320,779 describes a physical binding between the user and the mobile device, indicating that the user is in possession of the device. For this purpose, the mobile device functions as a radar device used for identifying the physical presence of the user. The binding between the user and mobile device may be revalidated by a face recognition process. Also, a user's natural, behavioral and radio signal fingerprints are captured.

U.S. Patent Application Publication No. 2019/0187265 describes a method for using a radar-based authentication system for sensing an identifying characteristic associated with a person detected in the radar field. Examples of such identifying characteristics include recognition of facial features, breathing-pattern, gait, other biometric characteristic(s), an item worn by the person, or a gesture performed by the person. This disclosure refers to a gesture deliberately performed, recorded, and stored by the authenticated person.

A chip-based radar sensor and related recognition algorithm, labeled "Motion Sense", which is available on some current smartphones, allows the detection of small finger gestures of the user to control the smartphone. The radar sensor can track sub-millimeter motions at high speed and accuracy. Thus, some intuitive finger gestures like rubbing of the fingers are detectable and linked with a related action of an application like zooming into or out of the picture on the display. Because these finger gestures are common for all human beings the related data recognized by the radar are unsuitable as such to distinguish between users.

Thus, there is a need in the art for a method supporting strong authentication for an application, requested of a legitimate user of a mobile device, by a further factor. There is further a need in the art for a method for securely prohibiting the further use of a previously accessed application by any unauthorized different user.

SUMMARY OF THE DISCLOSED TECHNOLOGY

In accordance with an embodiment of the disclosed technology, there is provided a method of authenticating a user using a mobile device. A first behaviometric user profile for a first user is generated and stored, by detecting a position and velocity of the first user relative to the mobile device based on a received response from a radar transmission while the first user uses the mobile device, the received response over time indicating a position and velocity of the first user. Based on further received responses of additional radar transmissions an additional behavioral pattern of an unknown user is determined. The additional behavioral pattern is then compared to the first behaviometric user profile, and based on the comparison, a measure of similarity between the first behaviometric user profile and the additional behavioral pattern, measuring if the first user and the unknown user are a same user, is heuristically determined. As a result of the comparison, operation or access to at least some data stored on the mobile device is prevented.

In some embodiments, the detected position of the first user relative to the mobile device includes a detected orientation of the first user, or of a body part of the first user.

In some embodiments, the unknown user is the first user, the method further including, prior to the determining the additional behavioral pattern, authenticating the first user on the mobile device by detecting biometric or behavioral characteristics related to a gesture or movement of the first user or of the mobile device.

In some embodiments, the additional behavioral pattern reinforces the authentication of the first user based on the biometric or behavioral characteristics.

In some embodiments, the method is carried out a predetermined period of time after an initial authentication of the first user, to ensure that the mobile device continues to be operated by the first user.

In some embodiments, the received response from the radar transmission includes a received response from a LIDAR (LIght Detection And Ranging) transmission.

In some embodiments, the received response from the radar transmission includes a received response from at least two radar transmissions of different types.

In some embodiments, the method further includes allowing operation of access to at least some data stored on the mobile device as a second result of the step of comparing.

In some embodiments, determining the additional behavioral pattern is synchronized in time with receipt, from the unknown user, of user responses to user prompts.

In some such embodiments, at least some of the user prompts are explicitly provided visually or audibly, and wherein the additional behavioral pattern includes at least one of a reaction time to the user prompt, an acting velocity for responding to the user prompt, and a specific motion or finger used for responding to the user prompt.

In some other such embodiments, at least some of the user prompts are implicitly provided, are hidden from the unknown user, and are based on the unknown user's desire to reach their goal without perceivable interference. For example, the implicitly provided user prompts may include at least one of an open pop-up advertising banner prompting the user to close the pop-up advertising banner, a beeping or music sound prompting the user to terminate the beeping or music sound, and a small window prompting the user to resize the window.

In some embodiments the method further includes, prior to generating the first user profile and to determining the additional behavioral pattern, determining times or types of movements to be included in the first user profile and the additional behavioral pattern.

In some embodiments, the method further includes receiving user-specific credentials from the unknown user. In such embodiments, determining the additional behavioral pattern occurs during the receiving of the user-specific credentials from the unknown user, and the additional behavioral pattern includes at least one of key pressing time stamps, swiping time stamps, and scrolling time stamps, as well as behavioral patterns of the user's finger movement during the unknown user entering the user-specific credentials.

In some embodiments, the method further includes using a machine learning based classifier to distinguish between the additional behavioral patterns stemming from different users. In some such embodiments, behavioral patterns are learned recursively, in a bottom-up approach, to generate fixed points in time, from which new distinct user behavior patterns for training of the classifier can be extracted automatically. This may include use of an automatic gesture delimiting classifier, such as a suitable neural network.

In some embodiments, the detected position and velocity of the first user relative to the mobile device include a detected position and velocity of a finger or a hand of the first user relative to the mobile device.

In some embodiments, the response from the radar transmission includes a response from a piece-wise continuous radar transmission.

In accordance with an embodiment of the disclosed technology, there is further provided a device and a method of authenticating a user to an application running on a mobile device. In a preparatory stage, a user profile of an authenticated user is generated, by extracting, from signals received from at least one radar sensor of the mobile device working at least piece-wise continuously in time, an authenticated behavioral pattern of the authenticated user and by securely storing characteristic data relating to the authenticated behavioral pattern as part of the user profile. At some later stage, a recent behavioral pattern of a user is extracted from recent signals received from the at least one radar sensor. Recent characteristic data relating to the recent behavioral pattern is identified, and is compared to the stored characteristic data, to extract a similarity measure between the recent characteristic data and the stored characteristic data. In response to the similarity measure being greater than a predefined threshold, the user is granted access to a requested application.

The signals used to extract the authenticated behavioral pattern include piece-wise continuous signals of at least one part of the authenticated user's fingers or hands. The recent signals used to extract the recent behavioral pattern include piece-wise continuous signals of at least one part of the user's fingers or hands.

In some embodiments, the user is the authenticated user, and the method further includes, prior to extracting the recent behavioral pattern, authenticating the user on the mobile device based on second sensor signals received from a second sensor. The second sensor signals are related to a gesture or movement of the user of the mobile device. In some such embodiments, the recent behavioral pattern is used to reinforce authentication based on the second sensor signals.

In some embodiments, the method is carried out a predetermined period of time after an initial authentication of the authenticated user, to ensure that the mobile device continues to be operated by the authenticated user.

In some embodiments, the at least one radar sensor includes a LIDAR (LIght Detection And Ranging) scanner.

In some embodiments, the at least one radar sensor includes at least two radar sensors of different types, and at least one of the authenticated behavioral pattern and the recent behavioral pattern is extracted based on signals received from both of the at least two radar sensors.

In some embodiments, the method further includes in response to the similarity measure being smaller than the predefined measure, denying the unidentified user access to the application.

In some embodiments, at least one of extracting the authenticated behavioral pattern and extracting the recent behavioral pattern is synchronized in time with receipt of user responses to user prompts provided by the application. This forms detection of the authenticated behavioral pattern and/or of the recent behavioral pattern that is highly localized in time and the spatial dimensions.

In some embodiments, the user prompts are explicitly provided visually or audibly. For example, the user prompts may include a button to be pressed, a captcha to be entered, a calculation to be solved, and the like. In such cases, the authenticated behavioral pattern and/or the recent behavioral pattern includes at least one of a reaction time to the user prompt, an acting velocity for responding to the user prompt, and a specific motion or finger used for responding to the user prompt.

In other embodiments, the user prompts are implicitly provided, are hidden from the user, and are based on the user's desire to reach their goal without perceivable interference. In such embodiments, the implicitly provided user prompts include at least one of an open pop-up advertising banner prompting the user to close the pop-up advertising banner, a beeping or music sound prompting the user to terminate the beeping or music sound, and a small window prompting the user to resize the window.

In some embodiments, the method further includes, prior to extracting the authenticated behavioral pattern and to extracting the recent behavioral pattern, determining times or types of movements to be included in extracted behavioral patterns.

In some embodiments, the method further includes authenticating the user by receiving user-specific credentials from the user, and extracting the recent behavioral pattern occurs during the receiving of the user-specific credentials from the user. In some cases, the recent behavioral pattern includes at least one of key pressing time stamps, swiping time stamps, and scrolling time stamps, as well as behavioral patterns of the user's finger movement during the authenticating step.

In some embodiments, the method further includes using a machine learning based classifier to distinguish between radar-detected behavioral patterns stemming from different users. In some such embodiments, behavioral patterns are learned recursively, in a bottom-up approach, to generate fixed points in time, from which new distinct user behavior patterns for training of the classifier can be extracted automatically. This may include use of an automatic gesture delimiting classifier, such as a suitable neural network.

For purposes of this disclosure, the following definitions are used:

"Authentication" is the verification of that a user is allowed to access certain data based on receiving an input from or related to the user including any of biometric, behaviometric, and/or inputs to sensors including key presses, passwords, code numbers, patterns, and gestures.

"Biometric" is data which relates to the biology or physiology of a user including a retinal pattern, fingerprint, or face configuration.

"Behaviometric", used interchangeably as an adjective with "behavioral", is data pertaining to a manner of operation of a device as recorded by one or a plurality of sensors in the device or by way of external sensors in other devices. This includes radar sensors, Light Detection and Ranging (LIDAR) scanners, cameras, accelerometers, gyroscopes, touch sensors (including touch screens), and processors which measure any or a combination of device angle, key press, position on a screen pressed, swipe speed, swipe intensity (pressure), temperature, and so forth. Behaviometric data changes over time in some instances whereas biometric data is more likely to remain constant or substantially constant.

"Data" is any tangible information which can be or is stored on a physical disk, and/or volatile memory, and/or which is transferred via a network connection.

"Radar sensor" includes acoustic-wave, radio-wave and light-wave radars or other active sensors working at least piece-wise continuously, at each time instant being able to detect reflective objects in the environment and form a spatial picture of its surroundings with highly accurate distance information relating to the objects in its surroundings, at least in a space sector of 1 sr (steradian) and at least over a distance interval from 5 cm to 20 cm in embodiments of the disclosed technology.

"Piece-wise" is defined as "obtaining data through multiple interactions serially or with breaks over a period of time" where, in some embodiments of the disclosed technology, the "piece-wise" data received is put together into a larger whole of data which is then useful in determining behaviometric characteristics.

"Input" is defined as "what is put in, taken in, or operated on by any process or system, such as the action or process of putting or feeding something into a system or the information fed into a computer or computer program."

"Key" is defined as "each of several buttons on a panel, such as a virtual or physical keyboard, for operating a computer or system of which are used to enter data, input data, or operate on (data)."

A "module" is defined as each of a set of standardized parts or independent units that can be used to construct a more complex structure, such as a component of a computer system.

An "unknown user" is defined as a user which may or may not be believed to be the authenticated user, or first user, until verified to be the first user, or authenticated user, based on biometric comparisons between the users.

Any device or step to a method described in this disclosure can comprise or consist of that which it is a part of, or the parts which make up the device or step.

The term "and/or" is inclusive of the items which it joins linguistically and each item by itself "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Many web pages and applications, such as those of financial institutions, typically have an initial login page where authentication information is entered. Subsequently, if the authentication information is valid, the user is authenticated and is granted access to the website or application, or to parts thereof. The disclosed technology provides a method for authenticating a user based on radar-detected signals, which may be used to reinforce authentication based on user credentials, or as a replacement for such authentication. Additionally, the method of the disclosed technology may be repeated periodically after login, to determine whether the authenticated user is still the one operating the device. In a case in which the user is not authenticated, or the device is being operated by another use, access to the website or application may be denied.

In a preparatory stage of the method of the disclosed technology, a user profile of an authenticated user is generated, by extracting, from signals received from at least one radar sensor of the mobile device working at least piece-wise continuously in time, an authenticated behavioral pattern of the authenticated user and by securely storing characteristic data relating to the authenticated behavioral pattern as part of the user profile. At some later stage, a recent behavioral pattern of a user is extracted from recent signals received from the at least one radar sensor. Recent characteristic data relating to the recent behavioral pattern is identified, and is compared to the stored characteristic data, to extract a similarity measure between the recent characteristic data and the stored characteristic data. In response to the similarity measure being greater than a predefined threshold, the user is granted access to a requested application.

Embodiments of the disclosed technology will become more clear in view of the following description of the figures.

Figure 1:
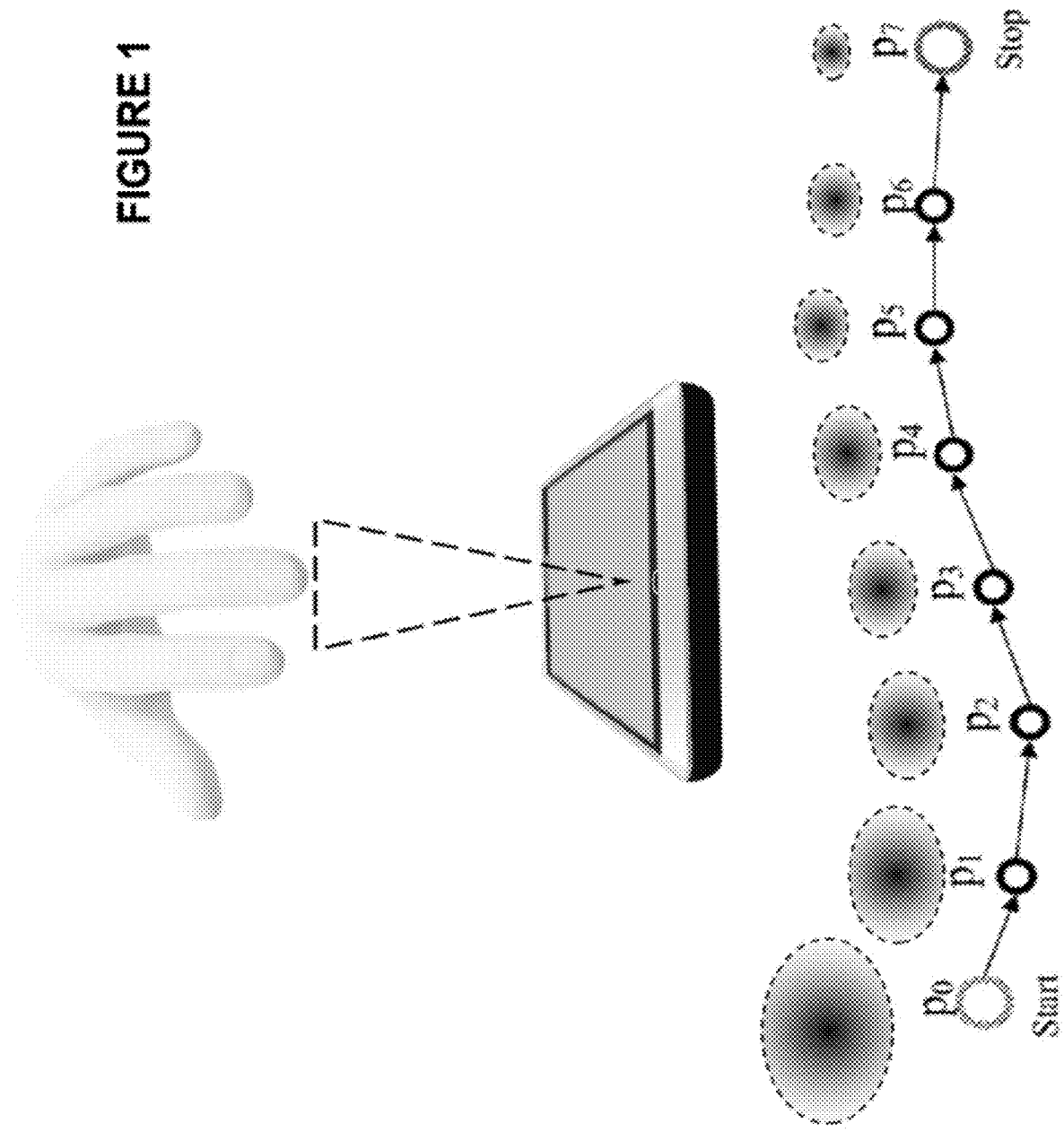
FIG. 1 shows a high level diagram of a radar-derived spatial picture of a fingertip traversing coordinates in space.

FIG. 1 shows a radar-derived spatial picture of a fingertip traversing coordinates in space. As seen in FIG. 1, the user's finger moves above, or across, a touch screen of a device, from a starting point p0 to a stopping point p7, via six interim points p1-p6. At each location, a different degree of pressure is applied, as indicated in the Figure by the size of the circle associated with each point. In addition to identifying the pressure applied by the finger, which may be identified by the touchscreen of the device or by the radar, the radar derived spatial image indicates which finger is applying pressure (the middle finger), how the hand is positioned during the movement, and various other attributes of the motion of the hand.

Figure 2:
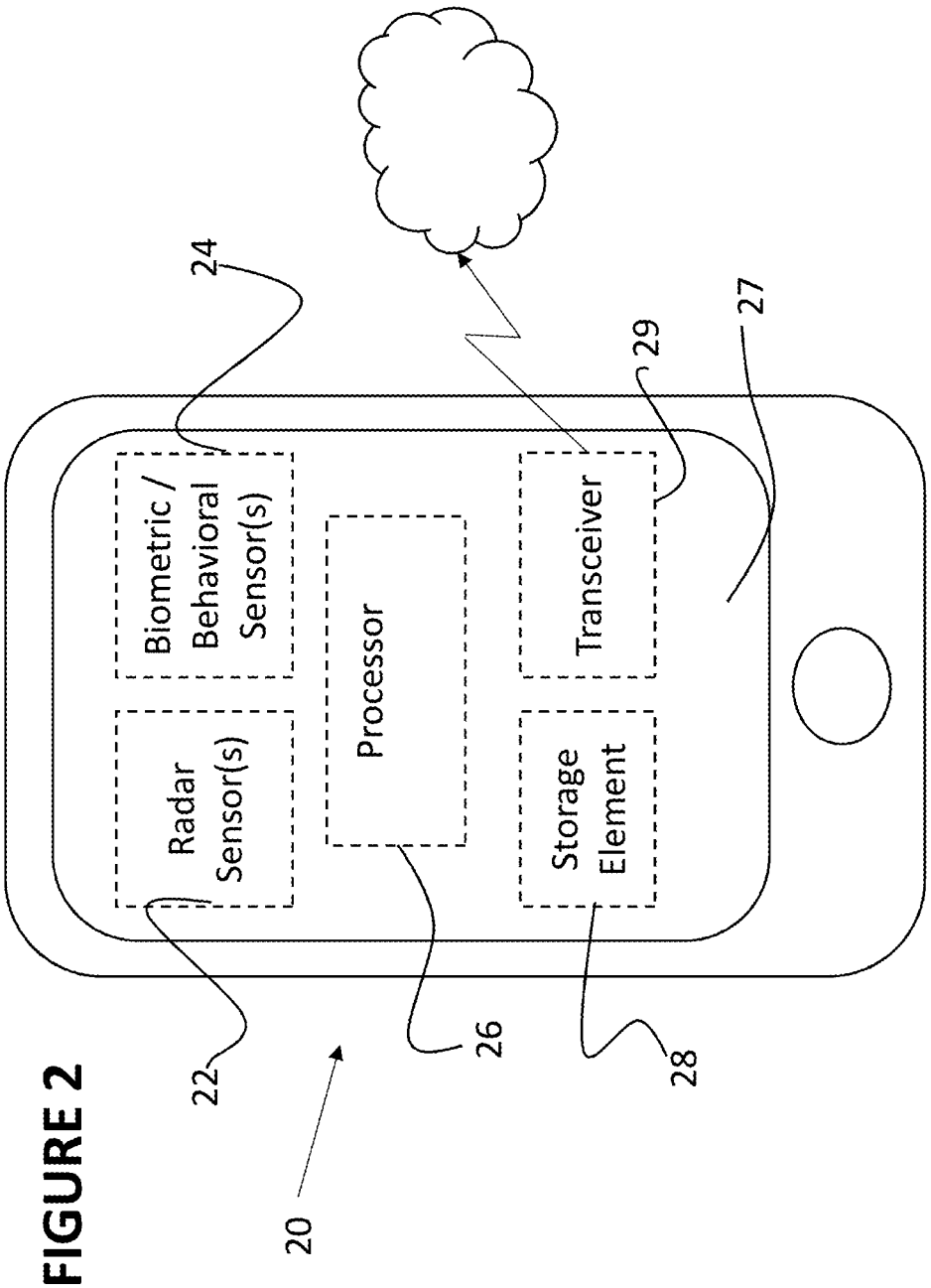
FIG. 2 shows a high level diagram of an exemplary device used to carry out embodiments of the disclosed technology.
Figure 3A:
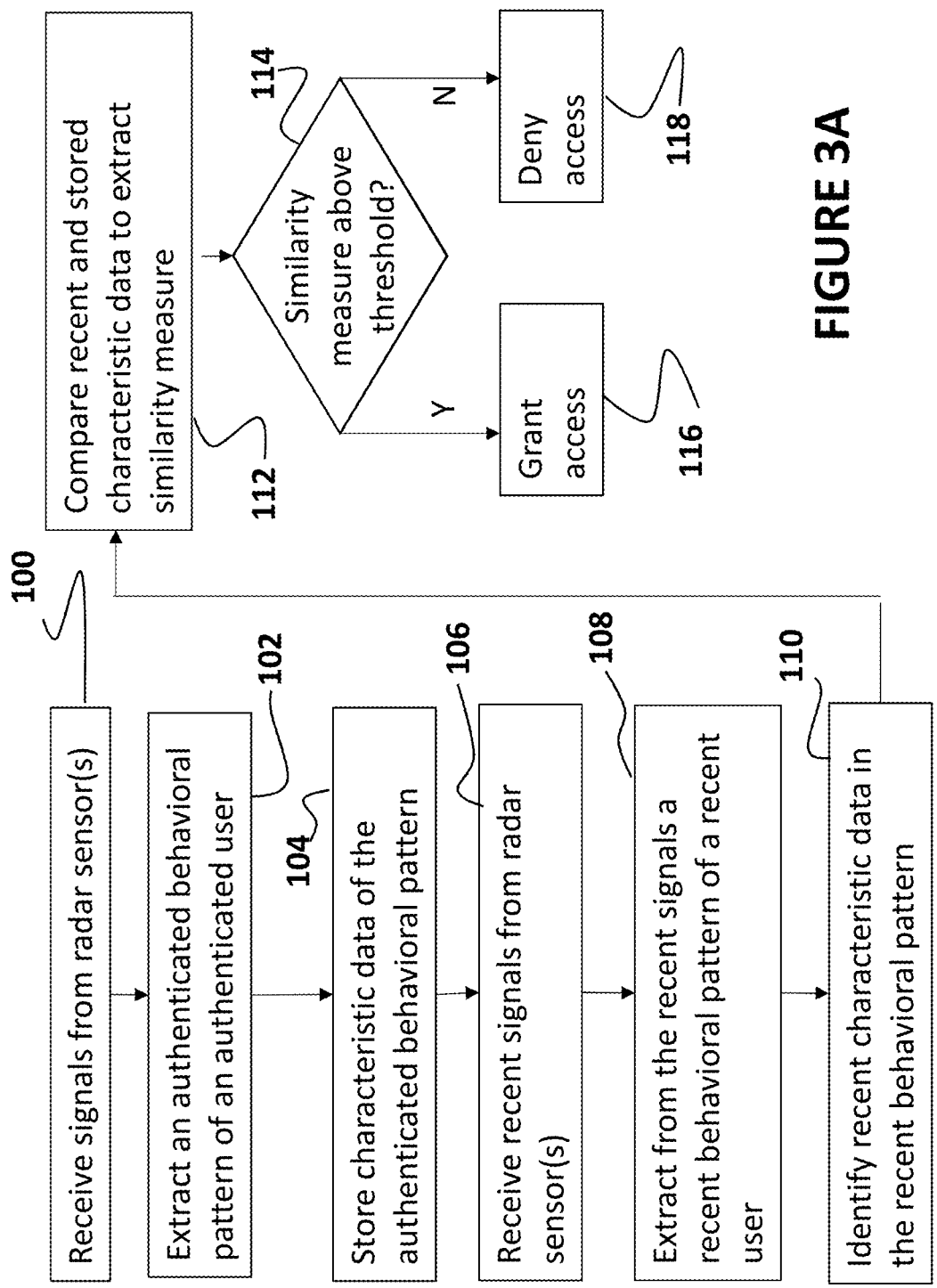
FIGS. 3A and 3B shows two high level charts of steps carried out in embodiments of the disclosed technology.
Figure 3B:
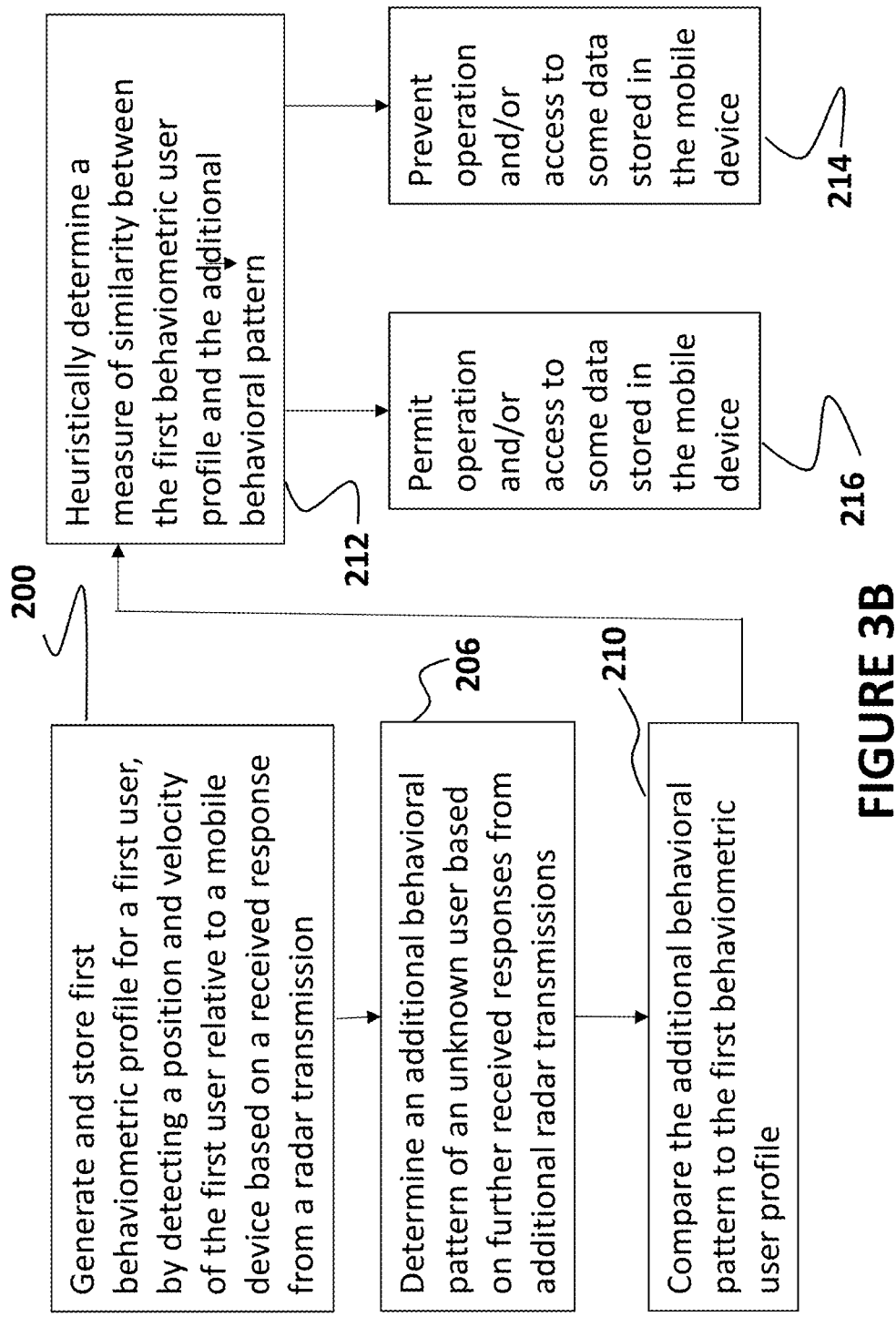

Spatial images of the type depicted in FIG. 1 are captured by radar sensors of devices of the disclosed technology, as illustrated in FIG. 2, and are used to authenticate users, for example using the method described with respect to FIGS. 3A and 3B.

FIG. 2 shows a high level diagram of an exemplary device 20 used to carry out embodiments of the disclosed technology. As seen in FIG. 2, device 20 may be any suitable device, and is typically a mobile device, such as a smartphone, a tablet computer, a laptop computer, or the like.

As seen, device 20 includes at least one radar sensor 22, and in some embodiments two or more such radar sensors. The radar sensor may be an acoustic wave radar sensor, a radio wave radar sensor, a light wave radar sensor, or any similar active sensor. In some embodiments, the radar sensor is a LIDAR (Light Detection And Ranging) scanner, which is based on sending and receiving the reflection of visible or invisible light rays including laser rays. In some embodiments, device 20 includes at least two radar sensors of different types. The radar sensor 22 senses signals from a vicinity of device 20, at least piece-wise continuously in time.

Device 20 may further include one or more additional sensors 24, which may capture signals relating to biometric and/or behavioral aspects of the user. For example, sensors 24 may include a fingerprint scanner, and iris scanner, an accelerometer or gyroscope, a touch sensor, a pressure sensor, and the like.

A processor 26 is functionally associated with radar sensor(s) 22 and with behavioral/biometric sensor(s) 24, as well as with one or more input interfaces 27 of device 20, which may include a touch screen, a touch pad, a keyboard, a mouse, buttons, and the like. Processor 26 is adapted to execute instructions stored in storage element 28, such as a non-volatile computer memory, to carry out the method of the present invention. Specifically, each of the method steps of the present invention, as described hereinbelow with respect to FIGS. 3A and 3B, may be embodied in computer instructions stored in storage element 28, which may be executed by processor 26 to carry out the method of FIGS. 3A and 3B. Processor 26 is further functionally associated with a network via a transceiver or network interface 29, for example for sending requests to websites and remote applications.

Reference is now made to FIG. 3A, which shows a high level chart of steps carried out in an embodiment of the disclosed technology. The description is provided with respect to device 20 of FIG. 2, but is equally applicable to any suitable device.

As seen in FIG. 3A, in a preparatory stage, a user profile for an authenticated user is gathered and stored. Specifically, at step 100, processor 26 receives signals from radar sensor(s) 22, the signals including piece-wise continuous signals of at least one part of the hands or fingers of the authenticated user. Processor 26 then extracts from the received signals an authenticated behavioral pattern of the authenticated user at step 102, and at step 104 stores characteristic data relating to the authenticated behavioral pattern as part of the user profile being generated. The signals received from radar sensor 22 typically provide information regarding a position and/or movement pattern of a person.

The authentication, or validation, stage, takes place at some later time. At step 106, processor 26 receives, from radar sensor(s) 22, recent signals, and extracts from the recent signals a recent behavioral pattern of a user at step 108. At this stage, it is unknown whether the user is the authenticated user, or another user. The recent signals including piece-wise continuous signals of at least one part of the hands or fingers of the user. At step 110, recent characteristic data relating to the recent behavioral pattern is identified by processor 26.

The recent characteristic data is then compared to the characteristic data stored in the user profile, at step 112, to extract a similarity measure indicative of a similarity between the recent characteristic data and the stored characteristic data. At step 114, it is determined whether the similarity measure is greater than a predetermined threshold value.

If the similarity measure is greater than the predetermined threshold value, then at step 116 the user, now identified as the authenticated user, is granted access to a requested website or application for which authentication is required. Otherwise, if the similarity measure is smaller than the threshold, which is indicative of the user being an unauthorized, at step 118, the user may be denied access to the requested website or application, or may be prompted to authenticate themselves using other means or methods.

As mentioned above, signals collected by radar sensor(s) 22 provide information relating to a position and/or movement pattern of a person, which provide for a highly secure level of authentication. Such authentication may be suitable, for example, for banking applications running on the mobile device 20.

In some embodiments, in which device 20 includes multiple radar sensors of different types, at steps 100 and/or 106 signals are received from each of the multiple radar sensors. As such, radar-specific advantages of each radar sensor, which are based on the different wave types and/or frequencies sensed by that radar sensor, may be combined, to facilitate detection of a more detailed picture of the reflecting objects in the vicinity of device 20. This, in turn, facilitates extraction of more accurate behavioral patterns at steps 102 and/or 108, respectively.

In some embodiments, steps 100 and/or 106 may be synchronized, in time, with control commands for the user, provided by the application. The control commands are defined as "a set of coded instructions read into memory and carried out by a processor to manipulate functionality of the handheld transceiver in some manner including, in some embodiments, transfer of data to a network node". As such, in some embodiments, the behavior detected by the radar sensor(s) 22 occurs during following of the control commands, resulting in a detection mode for the behavioral pattern that is highly localized in space and time.

In some such embodiments, as well as in other embodiments, a threshold can be set to identify which movements of the user's hands or fingers will be used for authentication, or when movements used for authentication should be provided (e.g., when moving toward the touchscreen). In such embodiments, the action of moving a finger onto the screen can be detected by position and velocity information of the radar sensor. Such a specific movement can constitute a part of a behavioral pattern, from which characteristic data is derived. Such an action can be used to identify and authenticate the user.

In some embodiments, at least some of the control commands are explicitly provided to the user, visually or audibly. For example, the control commands may be written on the screen, or may be provided by suitable visual and intuitive user interface elements, such as a button to be pressed, or a window to be closed, a captcha challenge to be entered, a single calculation to be solved, and the like. As another example, the control commands may be provided to the user via a speaker forming part of device 20. Use of explicit control commands enables sensor(s) 24, as well as radar sensor(s) 22, to collect behavioral pattern information relating to completion of the command, such as the user's reaction time, acting velocity, a specific finger used to provide the response, and the like. All this information may form part of the user-specific profile generated for the user, for example at step 104.

In some embodiments, at least some of the control commands are stochastically provided, and are hidden from the user. The user's interaction with these control commands is based on the user's desire to reach the goal application as soon as possible, without perceivable interference. Such control commands may include, for example, pop-up advertising banners for the user to close, loud or irksome noises, such as unexpected music or beeping sounds, for the user to mute, and a badly sized window for the user to resize in order for all the interface and/or text to be viewable. In such embodiments, information relating to the user's behavioral pattern may be collected in the background, without the user being aware of his receiving control commands for authentication purposes.

In some embodiments, the method described herein may function as a secondary mechanism for authenticating that the user of a device is authorized to access data on the device, or at least some of the data. In some such embodiments, an initial authentication step, typically based on signals received from biometric/behavioral sensor(s) 24, would precede the authentication stage of FIG. 3A. The initial authentication step may include, for example, authentication based on a touchscreen gesture module or an accelerometer. The secondary authentication may be used to grant access to data, including such data which requires a secondary and/or higher standard of authentication after a first authentication requirement has been met.

In some such embodiments, the radar sensor may collect signals during completion of the initial authentication step, such as during entering of user credentials, thereby collecting previously unavailable data relating to the physical route taken by the user's fingers before, during, and after making contact with the device. During completion of the necessary user authentication task, the behavioral pattern of the entering finger(s) is highly localized in space and exactly triggered in time by the secure login-routine of the application requested, facilitating recording and characterizing of specific behavioral pattern around each interaction such as key pressing, swiping, scrolling time stamps, without uncovering the user's credentials.

In some embodiments, the secondary authentication using the radar sensor according to the method of the disclosed technology may be used to improve classification of a gesture or movement of the device, such as a swipe, touch, press, scroll, twist or the like, initially identified by sensor(s) 24. For example, knowledge of which finger is used to carry out a swipe action, as obtained from a radar sensor, can be combined with sensed touchscreen input, such as pressure, size of contact area, and the like, to verify that the provided behavioral entry belongs to the authorized user.

In some embodiments, the behavioral pattern as extracted from the radar sensor signals may also relate to the user's hand or finger movement while moving toward or away from device 20. Such identification of motion can indicate whether input into device 20, for example via the touchscreen 27, was indeed provided by the hand whose motion was captured by the radar sensor. The readings of radar sensor(s) 22 and of behavioral/biometric sensor(s) 24 may be compared to determine and/or crosscheck that data received from the radar detection is authentic and represents what has actually occurred in the physical world. Thus, a user's hand inside a detectable space of the radar lobe can be used to detect small structures of each of the fingers of the user's hand, including their bones, as well as attached rings and gems, which are interacting with processor instructions which are executed on the mobile device to manipulate the device's functionality in some manner.

In some embodiments, the method described herein is carried out as a continuous authentication over a time period between a first authentication of the user and a further, or continuing, authentication of the user. In some embodiments, both authentication processes may be carried out in response to requests to access the same data (for example if the application had been open and had been unused for a while). In some embodiments, the authentication processes may be carried out in response to requests by two different software applications communicating with different third parties or with different servers on two different network nodes. In some embodiments, the first authentication process may authenticate the user to access some data, whereas the second, or continuing authentication process, is required as a stepped-up, or secondary authentication, to access more secure data. For example, the first authentication may be suitable for accessing data stored on the device, whereas the secondary authentication may be required to access secure data from a remote server, such as financial or banking data associated with the user.

In some embodiments, secondary or continuing authentication may be carried out after a predetermined period of time has elapsed from the initial authentication, in order to ensure that the device and/or the application are still being operated by the authorized user. This is because if a significant amount of time, for example from several minutes to several hours, has elapsed from the initial authentication, an unauthorized user may have gained possession of the user's device in the interim, for example by the device being stolen, or being forgotten or left somewhere for another person to find.

In some embodiments, the method disclosed herein may be used to distinguish between a human being interacting with the device and a bot simulating user interactions, based on behavioral patterns. Thus, misuse of the device, application, or data, by remote control of the mobile device, is prevented.

In some embodiments, the method of the disclosed technology may use machine learning methodologies and algorithms to identify patterns of characteristic data in radar sensor signals. For example, such machine learning algorithms may be used to create a classifier for distinguishing between radar patterns stemming from different users, thus increasing the likelihood of correct identification of authorized and un-authorized users. In some such embodiments, behavioral patterns are learned recursively, in a bottom-up approach, to generate fixed points in time, from which new distinct user behavior patterns for training of the classifier can be extracted automatically. This may include use of an automatic gesture delimiting classifier, such as a suitable neural network.

Reference is now made to FIG. 3B, which shows a second high-level chart of steps carried out in a second embodiment of the disclosed technology.

As seen in FIG. 3B, at step 200, a first behaviometric user profile for a first user is generated and stored. Specifically, a position and velocity of the first user relative to a mobile device, such as mobile device 20, are detected based on a received response from a radar transmission, e.g., from radar sensor(s) 22, while the first user uses the mobile device, where the received response over time indicates the position and velocity of the first user. In some embodiments, the detected position of the first user relative to the mobile device includes a detected orientation of the first user, or of a body part of the first user.

At step 206, an additional behavioral pattern of an unknown user is determined based on further received responses of additional radar transmissions. For example, the radar transmission may be from radar sensor(s) 22 and may be received by processor 26. The additional behavioral pattern is compared to the first behaviometric user profile at step 210.

At step 212, based on the comparison, a measure of similarity between the first behaviometric user profile and the additional behavioral pattern, measuring if the first user and the unknown user are the same user, is heuristically determined.

As a result of the comparing step, and in some cases based on the measure of similarity computed at step 212, operation and/or access to some data stored in the mobile device is prevented at step 214. This may occur, for example, if the comparing step or the measure of similarity indicate that the first user and the unknown user are not the same user. In other cases, operation and/or access to some data stored in the mobile device is permitted at step 216. This may occur when the comparing step and/or the measure of similarity indicate that the unknown user is the first user.

Additional aspects of the method shown in FIG. 3B are substantially as described hereinabove with respect to the method of FIG. 3A, and for brevity are not repeated here.

Figure 4:
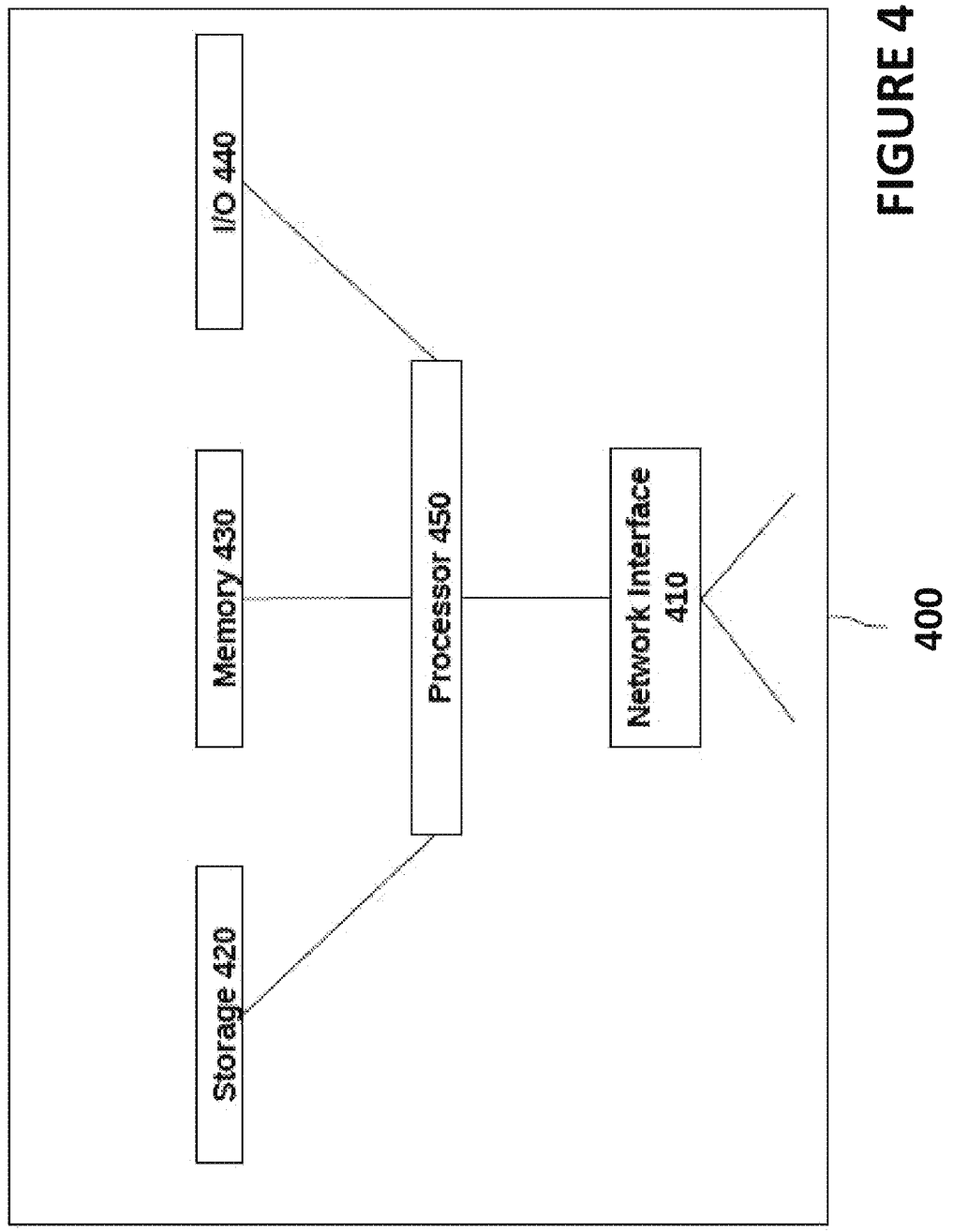
FIG. 4 shows a high level block diagram of devices used to carry out embodiments of the disclosed technology.

FIG. 4 shows a high-level block diagram of devices used to carry out embodiments of the disclosed technology. Device 400 comprises a processor 450 that controls the overall operation of the computer by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions. A device 400 also includes one or a plurality of input network interfaces for communicating with other devices via a network (e.g., the internet). The device 400 further includes an electrical input interface. A device 400 also includes one or more output network interfaces 410 for communicating with other devices. Device 400 also includes input/output 440 representing devices which allow for user interaction with a computer (e.g., display, keyboard, mouse, speakers, buttons, etc.). One skilled in the art will recognize that an implementation of an actual device will contain other components as well, and that FIG. 4 is a high-level representation of some of the components of such a device for illustrative purposes. It should also be understood by one skilled in the art that the method and devices depicted in FIGS. 1 through 3B may be implemented on a device such as is shown in FIG. 4.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

What is claimed is:

1. A method of authenticating a user using a mobile device, the method comprising:
   generating and storing a first behaviometric user profile for a first user by detecting a gesture or movement of the first user relative to the mobile device based on a received response from a radar transmission sent by the mobile device while the first user uses the mobile device, the received response indicating a position of the gesture or movement of the first user over a first time period;
   determining, based on further received responses of additional radar transmissions sent by the mobile device, an additional behavioral pattern comprising a gesture or movement of an unknown user responsive to one or more user prompts, wherein the one or more user prompts comprise at least one implicit prompt, wherein the at least one implicit prompt is stochastically provided by the mobile device, and wherein the at least one implicit prompt is implicitly provided and based on the unknown user reaching a goal without perceivable interference, and wherein the additional behavioral pattern is synchronized in time with the one or more user prompts;
   comparing the additional behavioral pattern to the first behaviometric user profile; and
   based on the comparing, determining a measure of similarity between the first behaviometric user profile and the additional behavioral pattern;
   determining, based on the measure of similarity, whether the first user and the unknown user are same user or different users;
   preventing operation or access to at least some data stored on the mobile device based on a determination that the first user and the unknown user are different users; and
   granting operation or access to at least some data stored on the mobile device based on a determination that the first user and the unknown user are the same user.

2. The method of claim 1, wherein the radar transmission is transmitted piece-wise continuously over the first time period.

3. The method of claim 1, wherein the measure of similarity is determined heuristically.

4. The method of claim 1, wherein the radar transmission is sent responsive to a first authentication of the first user.

5. The method of claim 4, wherein the first authentication comprises detecting biometric or behavioral characteristics of the first user of the mobile device.

6. The method of claim 4, wherein the additional behavioral pattern reinforces the authentication of the first user.

7. The method of claim 4, wherein the radar transmission is sent by the mobile device within a predetermined period of time after the first authentication of the first user to ensure that the mobile device continues to be operated by the first user.

8. The method of claim 1, wherein the received response from the radar transmission comprises a received response from a LIDAR (LIght Detection And Ranging) radar transmission.

9. The method of claim 1, wherein the radar transmission sent by the mobile device comprises one or more of acoustic-wave-based radar, radio-wave-based radar, and light-wave-based radar.

10. The method of claim 1, wherein the one or more user prompts are visually or audibly output by the mobile device, and wherein the additional behavioral pattern includes one or more of a reaction time to the one or more user prompts, an acting velocity for responding to the one or more user prompts, and a specific motion or finger used for responding to the one or more user prompts.

11. The method of claim 1, wherein the at least one implicit prompt is stochastically provided by outputting by the mobile device, at least one of an open pop-up advertising banner prompting the user to close the pop-up advertising banner, a beeping or music sound prompting the user to terminate the beeping or music sound, and a small window prompting the user to resize the window.

12. The method of claim 1, wherein the additional behavioral pattern includes one or more of key pressing time stamps, swiping time stamps, scrolling time stamps, and behavioral patterns of finger movement during entry of credentials.

13. The method of claim 1, further comprising, using a machine learning based classifier to distinguish between the first behaviometric user profile and the additional behavioral pattern.

14. The method of claim 1, wherein the granting operation or access to at least some data stored on the mobile device is responsive to the measure of similarity being greater than a predefined threshold.

15. A mobile computing device for authenticating a user, the mobile computing device comprising:
   a radar transceiver;
   at least one memory for storing data and computer-executable instructions;
   at least one processor configured to access the radar transceiver and the at least one memory, and further configured to execute the computer-executable instructions to:
      output, by the mobile computing device, one or more user prompts comprising at least one implicit prompt for an unknown user to perform a movement or gesture, wherein the at least one implicit prompt is stochastically provided by the mobile computing device, and wherein the at least one implicit prompt is implicitly provided and based on the unknown user reaching a goal without perceivable interference;
      detect, with the radar transceiver, a behavioral pattern synchronized in time with the one or more user prompts;
      compare the behavioral pattern to a stored pattern in a behaviometric profile of an authenticated user;
      based on the comparison, determine a measure of similarity between behavioral pattern and the behaviometric profile of the authenticated user;
      determine, based on the measure of similarity, whether the unknown user and the authenticated user are the same user or different users;
      prevent operation or access to at least some data stored on the mobile computing device based on a determination that the unknown user and the authenticated user are different users; and
      granting operation or access to at least some data stored on the mobile computing device based on a determination that the unknown user and the authenticated user are the same user.

16. The mobile computing device of claim 15, wherein the at least one processor is further configured to execute the computer-executable instructions to generate and save the behaviometric profile of the authenticated user after a first biometric authentication process by detecting, by the radar transceiver, a gesture or movement of the authenticated user over a first time period relative to the mobile computing device while the authenticated user uses the mobile computing device.

17. The mobile computing device of claim 15, wherein the one or more user prompts are visually or audibly output by the mobile computing device, and wherein the behavioral pattern includes one or more of a reaction time to the at least one implicit prompt, an acting velocity for responding to the at least one implicit prompt, and a specific motion or finger used for responding to the at least one implicit prompt, wherein the at least one implicit prompt comprises one or more of an open pop-up advertising banner prompting the user to close the pop-up advertising banner, a beeping or music sound prompting the user to terminate the beeping or music sound, and a small window prompting the user to resize the window.

18. The mobile computing device of claim 15, wherein the radar transceiver comprises a LIDAR (LIght Detection And Ranging) transceiver.

19. The mobile computing device of claim 15, further comprising, using a machine learning based classifier to distinguish between the behavioral pattern of the unknown user and the behaviometric profile of the authenticated user.

20. The mobile computing device of claim 15, wherein the granting operation or access to at least some data stored on the mobile device is responsive to the measure of similarity being greater than a predefined threshold.

* * * * *